United States Patent
Munemura et al.

(10) Patent No.: US 9,387,783 B2
(45) Date of Patent: Jul. 12, 2016

(54) VEHICLE SEAT

(75) Inventors: Nozomu Munemura, Yokohama (JP); Hironobu Nakane, Yokohama (JP); Ryo Nagahara, Yokohama (JP); Kensuke Nagai, Yokohama (JP)

(73) Assignee: NHK SPRING CO., LTD., Yokohama-Shi (JP)

( * ) Notice: Subject to any disclaimer, the term of this patent is extended or adjusted under 35 U.S.C. 154(b) by 68 days.

(21) Appl. No.: 14/345,620

(22) PCT Filed: Sep. 6, 2012

(86) PCT No.: PCT/JP2012/072796
§ 371 (c)(1),
(2), (4) Date: Oct. 22, 2014

(87) PCT Pub. No.: WO2013/042550
PCT Pub. Date: Mar. 28, 2013

(65) Prior Publication Data
US 2015/0042133 A1 Feb. 12, 2015

(30) Foreign Application Priority Data

Sep. 21, 2011 (JP) ................................. 2011-206093

(51) Int. Cl.
*B60N 2/42* (2006.01)
*B60N 2/427* (2006.01)
*B60N 2/68* (2006.01)

(52) U.S. Cl.
CPC .......... *B60N 2/4228* (2013.01); *B60N 2/42709* (2013.01); *B60N 2/42745* (2013.01); *B60N 2/68* (2013.01)

(58) Field of Classification Search
CPC .. B60N 2/4214; B60N 2/4221; B60N 2/4228; B60N 2/42709

USPC ............................. 297/216.1, 216.13, 216.14
See application file for complete search history.

(56) References Cited

U.S. PATENT DOCUMENTS 5,219,202 A * 6/1993 Rink .................. B60N 2/42709
297/216.13
6,053,571 A * 4/2000 Faigle .................. B60N 2/4228
297/216.1

(Continued)

FOREIGN PATENT DOCUMENTS

CN 101918243 12/2010
JP 10-309968 A 11/1998

(Continued)

OTHER PUBLICATIONS

Office Action dated Oct. 22, 2015 in corresponding Chinese Patent Application No. 201280045243.6.

*Primary Examiner* — Jose V Chen
(74) *Attorney, Agent, or Firm* — Knobbe Martens Olson & Bear LLP (57) ABSTRACT

Load imparted to a seat back frame is stably absorbed and efficiently absorbed. In a vehicle seat 10, a weak portion 48 is formed by a fixing plate (50). The weak portion (48) continuously extends from an edge portion of a fixing hole (44) in the relative movement direction with respect to a hinge base bracket (40) of a fastening bolt. Thus the weak portion (48) presses against the fastening bolt when the hinge base bracket (40) rotationally moves about the axial line of a support hole (42). Moreover, when the weak portion (48) plastically deforms, deformation so as to press the weak portion (48) wider is suppressed, such that the weak portion (48) is deformed so as to be squashed. Consequently, load imparted to a seatback frame (64) can be stably absorbed by the weak portion (48). Moreover, due to the weak portion (48) continuously plastically deforming when the weak portion (48) is plastically deformed by the fastening bolt, the load imparted by the weak portion (48) to the seatback frame (64) can be efficiently absorbed.

9 Claims, 7 Drawing Sheets

(56) References Cited

U.S. PATENT DOCUMENTS

| | | | |
|---|---|---|---|
| 6,296,306 B1* | 10/2001 | Specht | B60N 2/0232 |
| | | | 297/216.13 |
| 6,702,387 B2* | 3/2004 | Munemura | B60N 2/4221 |
| | | | 297/216.1 |
| 7,070,236 B2* | 7/2006 | Kawashima | B60N 2/4228 |
| | | | 297/216.1 |
| 8,136,878 B2* | 3/2012 | Nitsuma | B60N 2/4228 |
| | | | 297/216.13 |
| 8,210,606 B2* | 7/2012 | Meghira | B60N 2/4214 |
| | | | 297/216.1 |
| 2002/0063464 A1 | 5/2002 | Munemura et al. | |
| 2010/0259076 A1* | 10/2010 | Meghira | B60N 2/4214 |
| | | | 297/216.1 |

FOREIGN PATENT DOCUMENTS

| | | |
|---|---|---|
| JP | 2001-260726 A | 9/2001 |
| JP | 2002-096666 A | 4/2002 |
| JP | 2008-230557 A | 10/2008 |
| JP | 2008-238969 A | 10/2008 |
| JP | 2009-220744 A | 10/2009 |
| JP | 2010-500213 A | 1/2010 |

* cited by examiner

VEHICLE SEAT

CROSS-REFERENCE TO RELATED APPLICATIONS

This application is the U.S. National Phase under 35 U.S.C. §371 of International Application PCT/JP2012/072796, filed Sep. 6, 2012, which claims priority to Japanese Patent Application No. 2011-206093, filed Sep. 21, 2011. The disclosures of the above-described applications are hereby incorporated by reference in their entirety. The International Application was published under PCT Article 21(2) in a language other than English.

TECHNICAL FIELD

The present invention relates to a vehicle seat equipped with a coupling member that couples together a cushion frame and a seatback frame.

BACKGROUND ART

In the vehicle seat described in Japanese Patent Application Laid-Open (JP-A) No. 2008-238969, a seating portion is provided, and a seatback is coupled to the seating portion. The seatback includes a lower portion frame, and a first pin and a second pin are provided to the lower portion frame. The seatback includes side frames, and a first through hole and a second through hole are formed to each of the side frames. An auxiliary hole portion is in communication with the second through hole, and the auxiliary hole portion is open to the second through hole side. The side frames are coupled to the lower portion frame by inserting the first pin through the first through hole, and inserting the second pin through the second through hole.

However, when an impact load is imparted to the seatback in the vehicle rear direction, the side frames rotate centered on the first pin, and an edge portion of the second through hole abuts the second pin at two connection portions of the second through hole and the auxiliary hole portion. The auxiliary hole portion deforms by being pressed to be widened by the second pin. The impact energy imparted to the seatback is thereby used to deform the auxiliary hole portion, enabling the impact load imparted to the seatback to be absorbed.

Moreover, the automobile seat described in JP-A No. 2010-500213 is equipped with a seat portion structure. An adapter is coupled to the seat portion structure by a pivot and fixing screw, and a backrest structure is coupled to the adapter.

A hole is provided in the adapter into which the fixing screw is inserted. Cutout portion are formed at a side portion of this hole so as to pierce through at specific intervals, with a connection portion configured between the hole and the cutout portion, and between one cutout portion and the other cutout portion.

However, when an impact load is imparted to the backrest structure in the vehicle rear direction, the adapter rotates about the pivot, the connection portion between the hole and the cutout portion makes contact with the fixing screw and is broken (deformed). When the connection portion was broken, the broken connection portion then makes contact with the next connection portion between one cutout portion and another cutout portion. The impact energy imparted to the backrest structure is used as energy to break (deform) each of the connection portions, thereby enabling the impact load imparted to the backrest structure to be absorbed.

LIST OF PATENT DOCUMENTS

Patent Document 1: Japanese Patent Application Laid-Open (JP-A) No. 2008-238969
Patent Document 2: JP-A No. 2010-500213

SUMMARY OF INVENTION

Technical Problem

However, in the vehicle seat described in JP-A No. 2008-238969, when the impact load is imparted as described above to the seatback in the vehicle rear direction, the edge portion of the second through hole makes contact with the second pin at the two connection portions of the second through hole and the auxiliary hole portion, and the auxiliary hole portion is pressed to be widened by the second pin. Thus there is the possibility of the auxiliary hole portion deforming, even when the impact load imparted to the seatback is low. There is accordingly the possibility that impact load imparted to the seatback cannot be stably absorbed.

Moreover, in the automobile seat described in JP-A No. 2010-500213, breaking (deformation) of each of the connection portions occurs intermittently, and so impact load imparted to the backrest structure is intermittently absorbed. This means that the impact load cannot be absorbed efficiently.

In consideration of the above circumstances, a subject of the present invention is to provide a vehicle seat capable of absorbing load imparted to a seatback frame stably and efficiently.

Solution Addressing to Subject

A vehicle seat according to a first aspect includes: a cushion frame provided inside a seat cushion; a seatback frame provided inside a seatback; a coupling member that supports the seatback frame rotatably, that is provided with a fixing hole such that the coupling member is fixed to the cushion frame, and that couples together the cushion frame and the seatback frame; a fixing portion that is inserted through the fixing hole, and that fixes the coupling member to the cushion frame; a plate that is integrally provided at one side in a sheet thickness direction of the coupling member, that is fixed to the coupling member and to the cushion frame by the fixing portion, and that is provided with a weak portion that continuously extends from an edge portion of the fixing hole in a direction of relative movement of the fixing portion with respect to the coupling member when load is imparted to the seatback frame in the vehicle rear direction; and a first thickened portion that is formed by integrally providing a support plate to the coupling member at a vehicle rear direction from the fixing hole and at one side in the sheet thickness direction of the coupling member, and that includes a support hole for coupling the coupling member to the cushion frame.

In the vehicle seat according to the first aspect, the fixing hole is provided to the coupling member, and the fixing portion is inserted through the fixing hole so as to fix the coupling member to the cushion frame. The coupling member also supports the seatback frame rotatably, and the cushion frame and the seatback frame are thereby coupled together by the coupling member. Consequently, when load is imparted to the seatback frame in the vehicle rear direction and a force, which is larger than a force caused by the fixing portion fixing the coupling member to the cushion frame, acts on the coupling member, the coupling member relatively moves with respect to the cushion frame and the fixing portion. In other words, the fixing portion relatively moves with respect to the coupling member.

When this occurs, the plate is integrally provided at one side in the sheet thickness direction of the coupling member and the plate is fixed to the coupling member and to the cushion frame by the fixing portion. The weak portion is also provided at the plate, and the weak portion extends from the edge portion of the fixing hole in the direction of relative movement of the fixing portion with respect to the coupling member when the load is imparted to the seatback frame in the vehicle rear direction. Thus when the fixing portion moves relative to the coupling member, the weak portion is pressed by the fixing portion. Accordingly, the weak portion plastically deforms when the force of the fixing portion pressing the weak portion is higher than the mechanical strength of the weak portion.

Since the weak portion extends continuously from the edge portion of the fixing hole, deformation so as to press the weak portion to be widened is suppressed when the weak portion plastically deforms, but the weak portion is deformed so as to be squashed. Consequently, plastic deformation of the weak portion is suppressed at light loads, and yet large loads imparted to the seatback frame can be stably absorbed by the weak portion. Moreover, because the weak portion is continuously plastically deformed when the weak portion is plastically deformed by the fixing portion, the load imparted to the seatback frame can be efficiently absorbed by the weak portion.

Additionally, the first thickened portion is formed by integrally providing a support plate at one side in the sheet thickness direction of the coupling member and at a vehicle rear direction from the fixing hole at the coupling member. And the first thickened portion includes a support hole for coupling the coupling member to the cushion frame. The coupling member can accordingly be easily coupled to the cushion frame at a position of the first thickened portion by inserting a support bolt inside the support hole. The strength of the weak portion can also be easily set lower than that of the first thickened portion. A4

A vehicle seat according to a second aspect is the vehicle seat according to the first aspect, wherein the coupling member rotationally moves upward, centered on the support hole, when the load is imparted to the seatback frame in the vehicle rear direction.

In the vehicle seat according to the second aspect, the coupling member rotationally moves upward, centered on the support hole, when the load is imparted to the seatback frame in the vehicle rear direction. The fixing portion accordingly relatively moves downward with respect to the coupling member, and the weak portion is provided extending below the fixing hole. Thus when, for example, the coupling member supports the seatback frame rotatably through a reclining mechanism, since the weak portion is present extending on an opposite side of the fixing hole to a side where the reclining mechanism is provided, influence to the reclining mechanism can be suppressed when the weak portion is plastically deformed by the fixing portion.

A vehicle seat according to a fourth aspect is the vehicle seat according to the second aspect, wherein an elongated hole is provided to the plate such that one end portion of the elongated hole is in communication with the fixing hole and the elongated hole extends from the one end portion along the direction of relative movement of the fixing portion with respect to the coupling member.

In the vehicle seat according to the fourth aspect, the elongated hole is provided in the plate. One end portion of the elongated hole is in communication with the fixing hole, and the elongated hole extends from the one end portion along the direction of relative movement of the fixing portion with respect to the coupling member. The weak portion can thereby be easily provided so as to continuously extend from the edge portion of the fixing hole. Movement of the coupling member can be guided by the elongated hole when the load is imparted to the seatback frame in the vehicle rear direction and the coupling member relatively rotates with respect to the fixing portion.

A vehicle seat according to a fifth aspect is the vehicle seat of the fourth aspect, wherein a width dimension of the elongated hole is set so as to become larger on progression in a direction away from the one end portion.

In the vehicle seat according to the fifth aspect, due to setting the width dimension of the elongated hole so as to become larger on progression in the direction away from the one end portion, a portion of the weak portion, which has been squashed by the fixing portion, can be easily pressed out to outside in the width direction of the elongated hole.

A vehicle seat of a sixth aspect is the vehicle seat of the fourth aspect, wherein a width dimension of the elongated hole is set so as to become smaller on progression in the direction away from the one end portion.

In the vehicle seat according to the sixth aspect, due to the width dimension of the elongated hole being set so as to become smaller on progression in the direction away from the one end portion, the elongated hole plastically deforms so as to be gradually pressed to be widened by the fixing portion when the coupling member relatively moves with respect to the fixing portion. The load imparted to the seatback frame can accordingly be absorbed by deformation of the plate.

A vehicle seat according to a seventh aspect is the vehicle seat of any one of the second aspect to the sixth aspect, wherein a flange is formed at an outer peripheral portion between the fixing hole and the support hole of the coupling member so as to project out toward one side in the sheet thickness direction of the coupling member.

In the vehicle seat according to the seventh aspect, the flange is formed at the outer peripheral portion between the fixing hole and the support hole of the coupling member so as to project out toward the one side in the sheet thickness direction of the coupling member. Thus, for example, even though s sheet thickness of the first thickened portion is made thin in order to set the rigidity of weak portion, the rigidity of a portion between the fixing hole and the support hole of the coupling member can still be made high. Accordingly, when the load is imparted to the seatback frame in the vehicle rear direction and the coupling member rotates centered on the support hole, deformation of the portion between the fixing hole and the support hole of the coupling member is suppressed, and the load in the vehicle rear direction can be well transmitted to the weak portion. Thus, since the load imparted to the seatback frame can be mainly absorbed by the weak portion, the rigidity of the weak portion can be set without considering deformation of the coupling member.

A vehicle seat of an eighth aspect is the vehicle seat of the seventh aspect, wherein an attachment portion is formed at an upper side form the support hole of the coupling member such that a reclining mechanism is adopted to be attached to the attachment portion so as to couple together the coupling member and the seatback frame, and the flange extends along the outer peripheral portion of the coupling member as far as a vehicle rear side of the attachment portion.

In the vehicle seat according to the eighth aspect, the attachment portion is formed at the upper side form the support hole of the coupling member, and the reclining mechanism is attached to the attachment portion. The coupling member and the seatback frame are coupled together by the reclining mechanism. The flange also extends along the outer peripheral portion of the coupling member as far as the vehicle rear side of the attachment portion. The rigidity of the portion between the support hole and the attachment portion of the coupling member can accordingly be set high. Thus deformation of the coupling member can be suppressed to a greater extent when the load in the vehicle rear direction is input to the coupling member through the reclining mechanism. The rigidity of the weak portion can accordingly be set even more easily, without consideration deformation of the coupling member.

Advantageous Effects of Invention

According to the vehicle seat according to the first aspect, the load imparted to the seatback frame can be stably absorbed, and can be efficiently absorbed.

According to the vehicle seat according to the second aspect, influence to the reclining mechanism can be suppressed when the weak portion is plastically deformed by the fixing portion.

According to the vehicle seat of the fourth aspect, the weak portion can be formed with a simple configuration, and movement of the coupling member can be guided by the elongated hole.

According to the vehicle seat of the fifth aspect, the portion of the weak portion squashed by the fixing portion can be easily pressed out to the width direction outside of the elongated hole.

According to the vehicle seat according to the sixth aspect, the load imparted to the seatback frame can be effectively absorbed.

According to the vehicle seat according to the seventh aspect, the rigidity of the weak portion that absorbs the load can be set without considering deformation of the coupling member.

According to the vehicle seat according to the eighth aspect, the rigidity of the weak portion that absorbs the load can be even more easily set without considering deformation of the coupling member.

DESCRIPTION OF EMBODIMENTS

Figure 1:
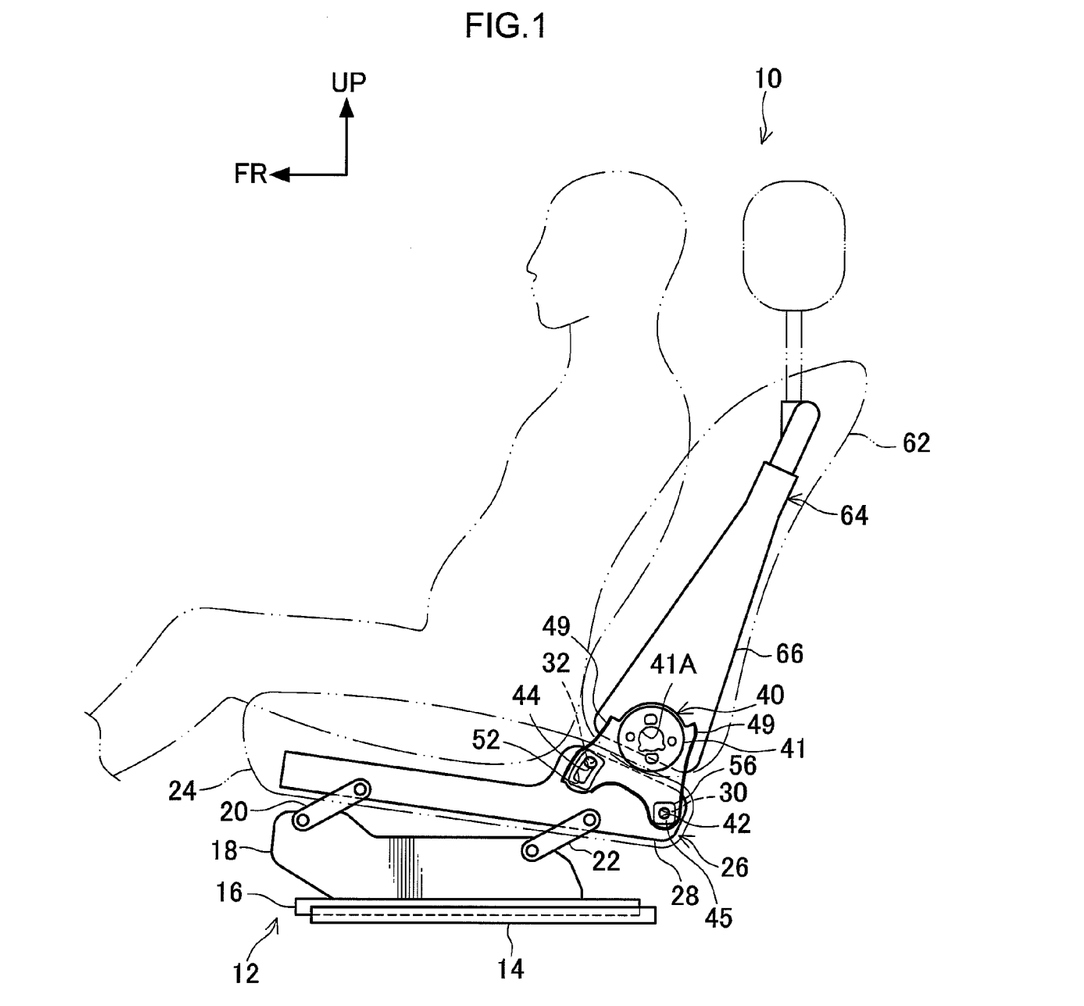
FIG. 1 is a side view illustrating a vehicle seat according to an exemplary embodiment of the present invention, as viewed from the vehicle left side.

FIG. 1 illustrates a side view of a vehicle seat 10 according to an exemplary embodiment of the present invention, as viewed from the vehicle left hand side. Note that where appropriate in the drawings, the arrow FR indicates the vehicle front direction, the arrow RH indicates the vehicle right direction, and the arrow UP indicates upward.

As illustrated in FIG. 1, the vehicle seat 10 is equipped at a lower portion with a front-rear position adjustment mechanism 12. The front-rear position adjustment mechanism 12 includes a pair of elongated shaped guide rails 14. The pair of guide rails 14 are disposed along the vehicle front-rear direction, and fixed to the vehicle body floor. Each of the guide rails 14 is provided with a respective upper rail 16, and the upper rail 16 is supported so as to be slidable with respect to the guide rail 14 in the vehicle front-rear direction. A riser 18 is fastened to each of the upper rails 16.

One end portion of a front side link 20 that configures a height adjustment mechanism, not illustrated in the drawings, is coupled so as to be relatively rotatable to a vehicle front side portion of an upper portion of the riser 18. One end portion of a rear side link 22 configuring the height adjustment mechanism is coupled so as to be relatively rotatable to a vehicle rear side portion of an upper portion of the riser 18.

Moreover, the vehicle seat 10 is equipped with a seat cushion 24, and the seat cushion 24 is disposed horizontally, or at an angle facing downward on progression toward the vehicle rear direction. A cushion frame 26 is provided inside the seat cushion 24. The cushion frame 26 is equipped at vehicle right and left side portions of the seat cushion 24 with a pair of side cushion frames 28 that are made from metal in a plate shape. The pair of side cushion frames 28 is disposed along the vehicle front-rear direction. The other end portion of the front side link 20 is coupled to a vehicle front side portion of a lower portion of each of the side cushion frames 28. The other end portion of the rear side link 22 is coupled so as to be relatively rotatable to a vehicle rear side portion of a lower portion of each of the side cushion frames 28. The cushion frame 26 is thereby coupled to the guide rails 14 through the height adjustment mechanism, the riser 18 and the upper rail 16.

Figure 2:
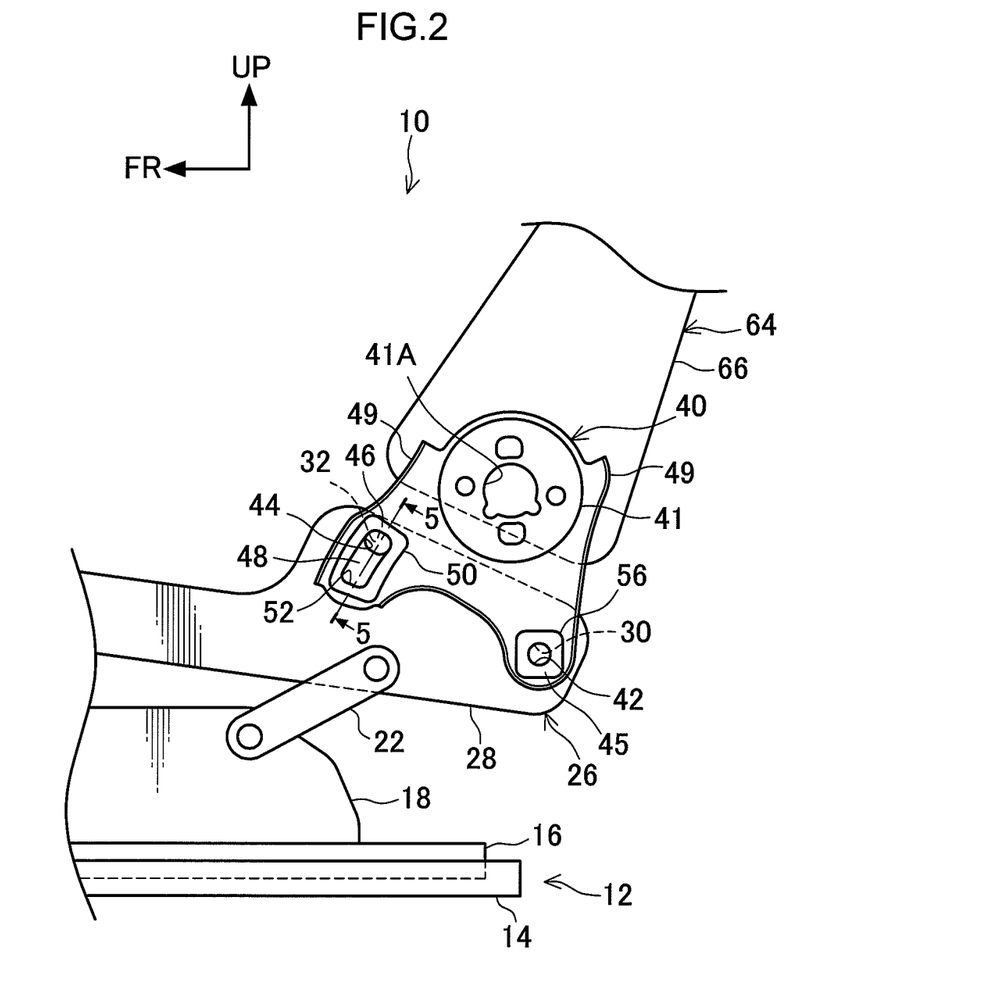
FIG. 2 is a side view of relevant portions of the vehicle seat illustrated in FIG. 1, as viewed from the vehicle left side.
Figure 3A:
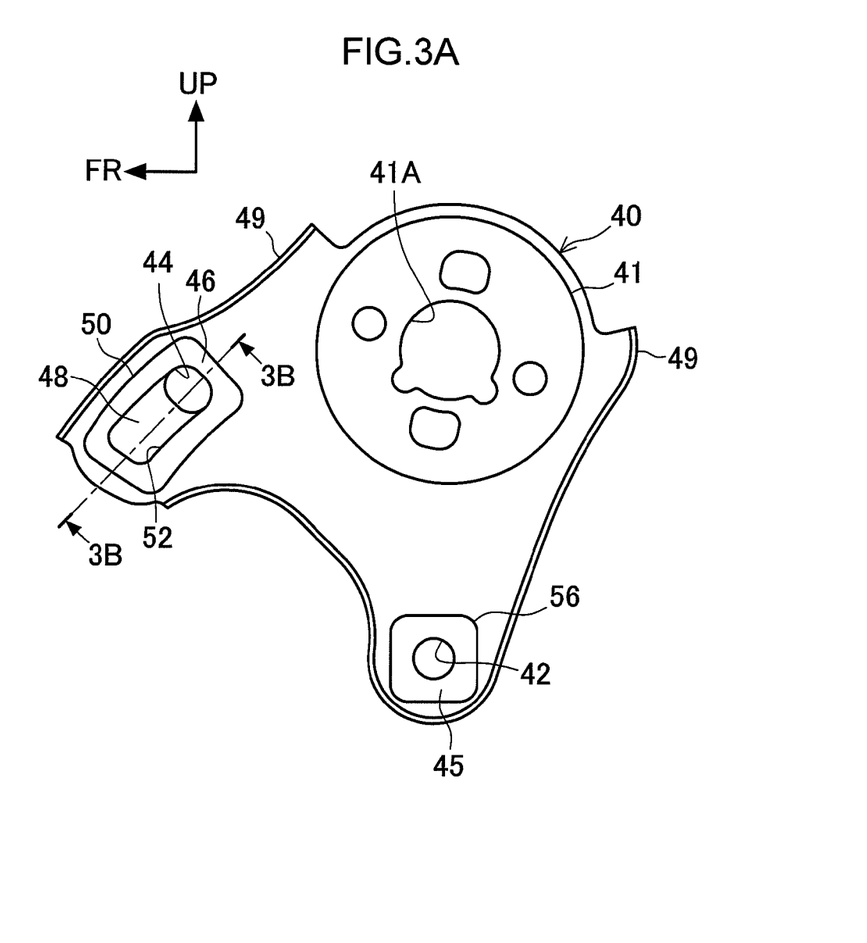
FIG. 3A is a side view of a hinge base bracket employed in the vehicle seat illustrated in FIG. 2, as viewed from the vehicle left side.
Figure 3B:
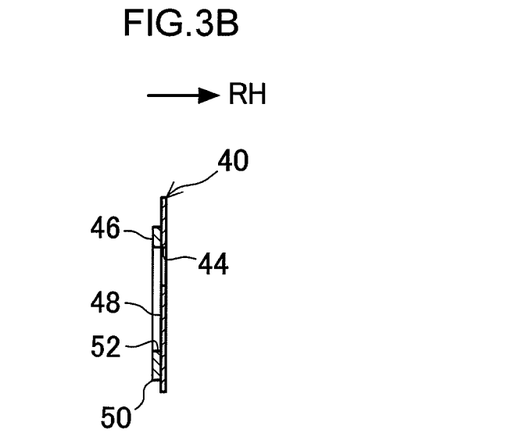
FIG. 3B is a cross-section of a portion of the hinge base bracket illustrated in FIG. 3A, as viewed from the vehicle rear and below directions (a cross-section taken on line 3B to 3B of FIG. 3A)
Figure 5:
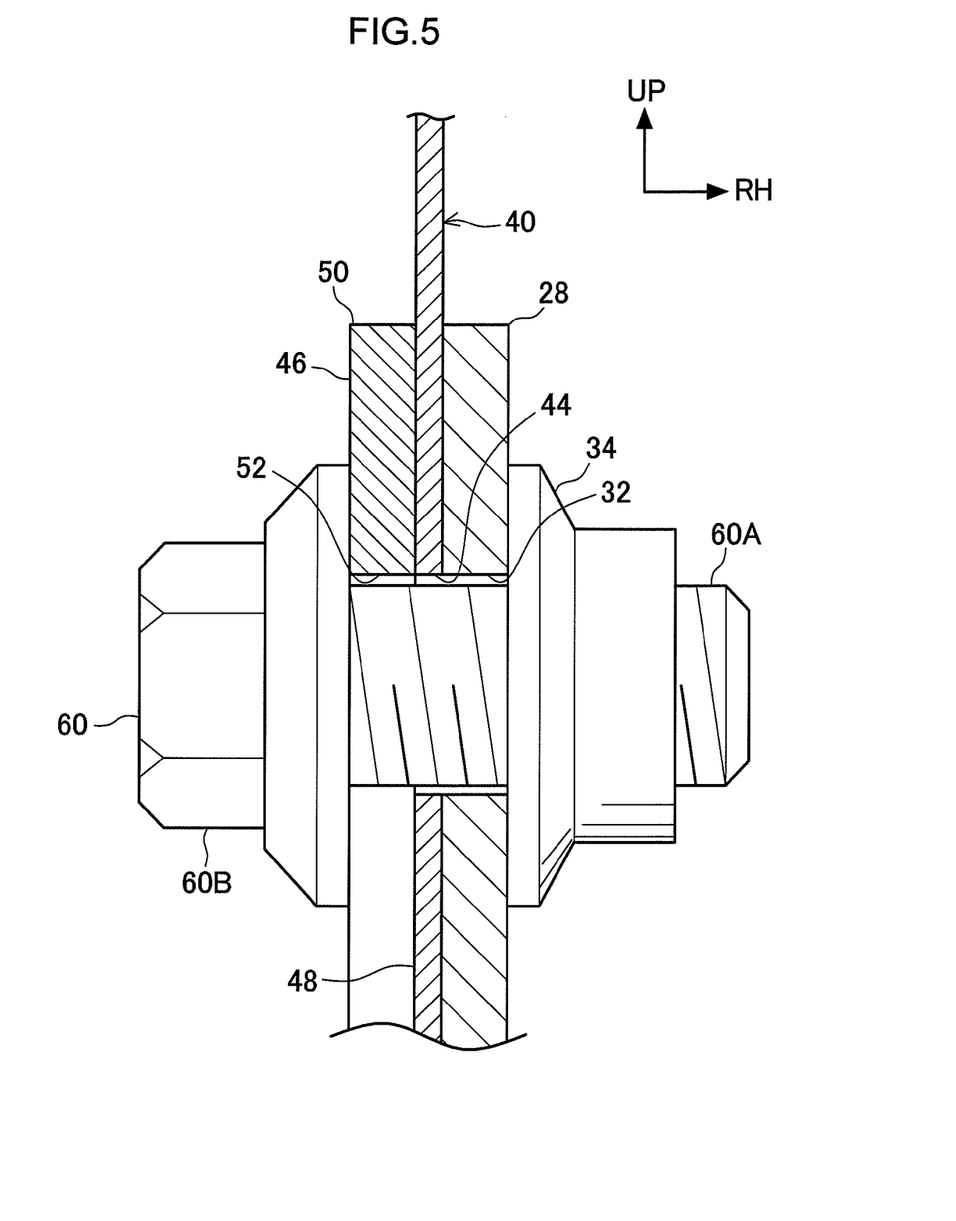
FIG. 5 is a cross-section of relevant portions of the vehicle seat illustrated in FIG. 2 as viewed from the vehicle rear side (a cross-section taken on line 5-5 of FIG. 2)

As illustrated in FIG. 1 and FIG. 2, a circular shaped support hole 30 is formed so as to pierce through an upper portion located at a vehicle rear direction at the side cushion frames 28. A substantially truck shaped placement hole 32 is formed so as to pierce through a vehicle front side portion from the support hole 30 at the side cushion frame 28. As illustrated in FIG. 5 a fastening nut 34 is provided at an inside (the facing sides of the pair of side cushion frames 28) of each of the side cushion frames 28. The fastening nut 34 is coaxially disposed to the placement hole 32 and is fixed by welding to the side cushion frame 28. A female thread portion, not illustrated in the drawings, is formed so as to pierce through a central portion of the fastening nut 34, and a female thread is formed to an inner peripheral portion of the female thread portion.

As illustrated in FIG. 1 to FIG. 4, a hinge base bracket 40 is respectively provided as a coupling member to the outside of each of the side cushion frames 28 (the opposite sides to the facing direction of the pair of side cushion frames 28). The hinge base bracket 40 is formed from sheet metal in a substantially triangular shape.

A support plate 56 is provided at a portion located at a vehicle rear direction on the opposite side to the cushion frame 28 side of the hinge base bracket 40. The support plate 56 is formed from sheet metal. The support plate 56 is joined, for example by welding, to the hinge base bracket 40 in a superimposed state, with a sheet thickness direction of the support plate 56 matching a sheet thickness direction of the hinge base bracket 40. The support plate 56 is thereby integrally provided to the hinge base bracket 40, and the portion where the hinge base bracket 40 and the support plate 56 are integrally provided is a first thickened portion 45.

A circular shaped support hole 42 is formed as a coupling portion so as to pierce through the first thickened portion 45 of the hinge base bracket 40, and the support hole 42 is disposed coaxially to the support hole 30 of the side cushion frame 28. A substantially circular pillar shaped support bolt, not illustrated in the drawings, is inserted through inside the support hole 42 and the support hole 30. A support nut, not illustrated in the drawings, is screwed onto the leading end portion of the support bolt, fastening (coupling) the hinge base bracket 40 and the support plate 56 to the side cushion frame 28.

Figure 4:
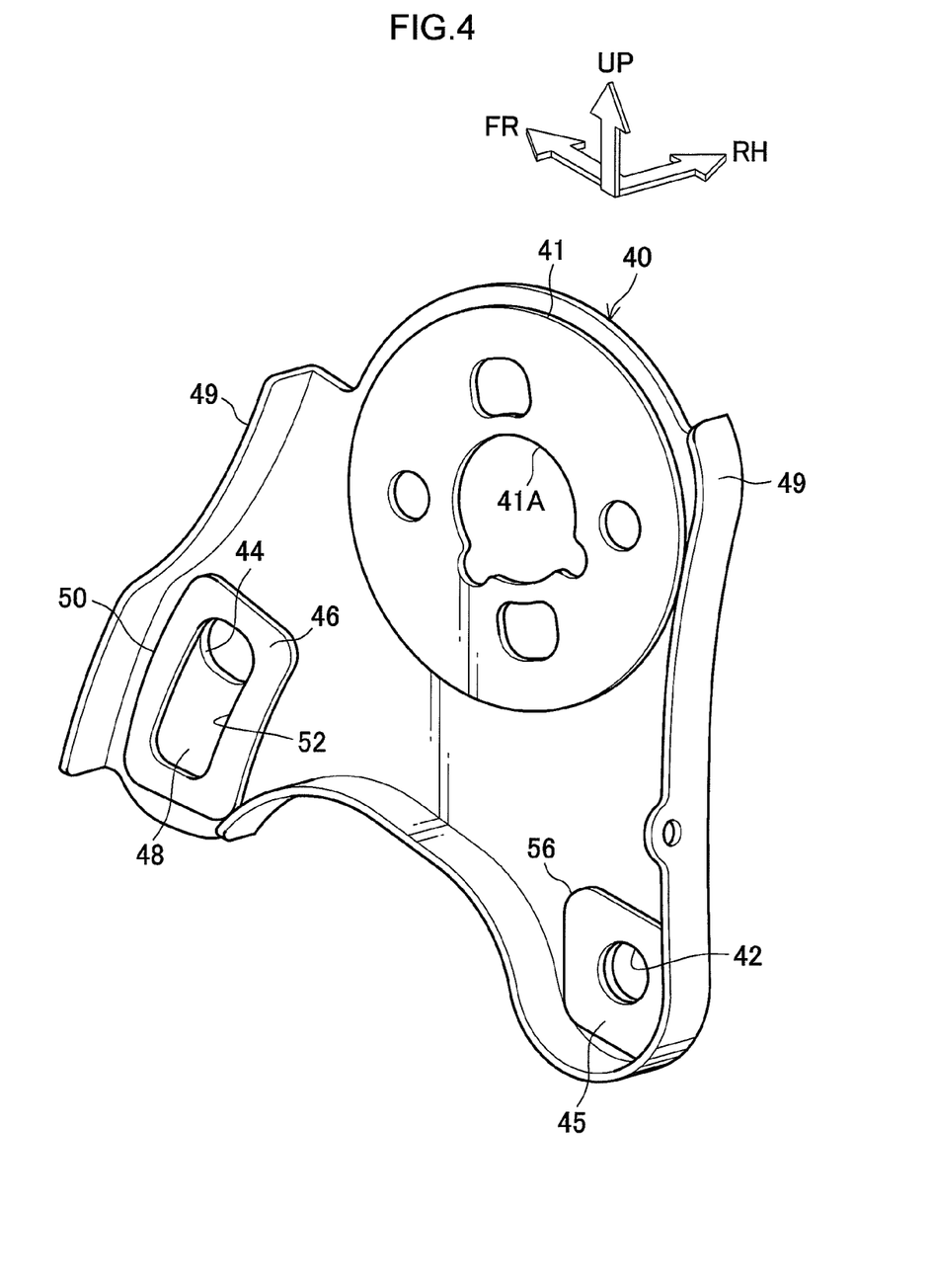
FIG. 4 is a perspective view illustrating the hinge base bracket illustrated in FIG. 3A.

As illustrated in FIG. 4 and FIG. 5, a substantially truck shaped fixing hole 44 is formed so as to pierce through a portion located at a vehicle front direction at a lower portion of the hinge base bracket 40. The fixing hole 44 is disposed coaxially to the placement hole 32 of the side cushion frames 28.

A fixing plate 50 is provided as a plate on the opposite side to that of the side cushion frames 28 of the hinge base bracket 40. The fixing plate 50 is formed from sheet metal in a substantially rectangular shape. The fixing plate 50 is formed so as to curve along a circumferential direction with the support hole 42 of the hinge base bracket 40 at the center. The fixing plate 50 is joined, for example by welding, to the hinge base bracket 40 in a superimposed state, with a sheet thickness direction of the fixing plate 50 matching the sheet thickness direction of the hinge base bracket 40. The fixing plate 50 is thereby integrally provided to the hinge base bracket 40.

A substantially rectangular shaped guide hole 52 is formed as an elongated hole so as to pierce through a central portion of the fixing plate 50. The guide hole 52 is formed so as to curve along the circumferential direction with the support hole 42 at the center. The length direction dimension of the guide hole 52 is set longer than the short direction dimension of the fixing hole 44. The guide hole 52 is also formed such that the fixing hole 44 is disposed inside the guide hole 52 in side view. In other words, an upper end portion (one end portion) of the guide hole 52 is formed so as to overlap with and communicate with the fixing hole 44 in side view, with the guide hole 52 provided extending downwards from the upper end portion. Thus at the periphery of the fixing hole 44, a second thickened portion 46 is configured at portions where the fixing plate 50 and the hinge base bracket 40 are integrally provided, and a weak portion 48 is configured at portions where the fixing plate 50 and the hinge base bracket 40 are not integrally provided (portions configured by the hinge base bracket 40 alone). The weak portion 48 is then formed continuously along the guide hole 52 from an edge portion of the fixing hole 44 toward the direction separating from the fixing hole 44 (downward). The sheet thickness of the weak portion 48 is formed so as to be thinner than the sheet thickness of the first thickened portion 45 and the second thickened portion 46, and hence the strength of the weak portion 48 is set lower than the strength of the first thickened portion 45 and the second thickened portion 46.

Moreover, as illustrated in FIG. 5, a substantially circular pillar shaped fastening bolt 60 serving as a fixing portion is inserted through inside the guide hole 52, the fixing hole 44, and the placement hole 32. A head portion 60B provided at one end portion of the fastening bolt 60 abuts the fixing plate 50. A male thread portion 60A is provided at the other end portion of the fastening bolt 60, and a male thread is formed at the outer peripheral portion of the male thread portion 60A. The leading end portion of the male thread portion 60A is screwed into the fastening nut 34 of the side cushion frame 28. The hinge base bracket 40 and the fixing plate 50 are thereby also fastened (fixed) to the side cushion frames 28 at the position of the fixing hole 44. Note that for convenience of explanation, the fastening bolt 60 is omitted from illustration in FIG. 1 and FIG. 2.

As illustrated in FIG. 1 to FIG. 4, a circular shaped attachment portion 41 is provided to a central portion of the hinge base bracket 40 for attaching a reclining mechanism, described later. A circular shaped attachment hole 41A is formed piercing through a central portion of the attachment portion 41.

A flange 49 is integrally formed to an outer peripheral portion of the hinge base bracket 40, at portions excluding below the fixing plate 50 and above the attachment portion 41. The flange 49 projects out from the hinge base bracket 40 to the opposite side to that of the side cushion frames 28. The overall rigidity of the hinge base bracket 40 is thereby secured by the flange 49.

Moreover, as illustrated in FIG. 1, the vehicle seat 10 is equipped with a seatback 62. The seatback 62 is disposed in an upright state at a vehicle rear direction end portion of the seat cushion 24. A seatback frame 64 is provided inside the seatback 62. The seatback frame 64 is equipped with a pair of side frames 66 that are formed from metal in plate shapes at a vehicle right side portion and a vehicle left side portion of the seatback 62. The side frames 66 are disposed at an inner side of the hinge base bracket 40. A known reclining mechanism, not illustrated in the drawings, is provided between lower end portions of the side frames 66 and the hinge base bracket 40, with the side frames 66 and the hinge base bracket 40 coupled together through the reclining mechanism. The seatback frame 64 is thereby supported by, and coupled to, the hinge base bracket 40 through the reclining mechanism.

Normally the hinge base bracket 40 is fixed so as to be relatively immovable with respect to the cushion frame 26 by fastening force due to a support bolt and a support nut, and fastening force due to the fastening bolt 60 and the fastening nut 34.

Explanation next follows regarding operation and advantageous effects of the present exemplary embodiment.

In the vehicle seat 10 of the present exemplary embodiment, with an occupant in a seated state on the vehicle seat 10, force due to inertia acts on the occupant toward the vehicle rear side when another vehicle collides with the vehicle from the vehicle rear direction (a rear collision), or the vehicle collides with another vehicle or the like when the vehicle is travelling backwards. At such times, the occupant is moved toward the seatback 62 side (the vehicle rear direction) by this force due to inertia, and impact load is imparted from the occupant to the seatback 62 (to the seatback frame 64).

When the impact load in the vehicle rear direction is imparted to the seatback 62 (the seatback frame 64), the impact load is transmitted to the hinge base bracket 40 through the side frames 66 and the reclining mechanism, and rotation force acts on the hinge base bracket 40 in a clockwise direction centered on the support hole 42 as illustrated in FIG. 1 (a vehicle upward direction).

Then when this rotation force is larger than the fastening force due to the support bolt and the support nut and the fastening force due to the fastening bolt 60 and the fastening nut 34, the hinge base bracket 40 rotationally moves about the axial line of the support hole 42. In other words, the fastening bolt 60 relatively moves with respect to the hinge base bracket 40.

The fixing plate 50 is integrally provided at the side in the sheet thickness direction of the hinge base bracket 40, and the fixing plate 50 is fixed to the hinge base bracket 40 and to the cushion frame 26 by the fastening bolt 60. The weak portion 48 is formed by the fixing plate 50, and the weak portion 48 extends from the edge portion of the fixing hole 44 in a direction along relative movement of the fastening bolt 60 with respect to the hinge base bracket 40. Thus when the hinge base bracket 40 rotationally moves about the axial line of the support hole 42, the weak portion 48 abuts (presses against) an outer peripheral portion of the male thread portion 60A of the fastening bolt 60. A pressing force accordingly acts on the weak portion 48 from the fastening bolt 60.

When the pressing force is greater than a mechanical strength of the weak portion 48, the weak portion 48 is plastically deformed by the fastening bolt 60, and the hinge base bracket 40 relatively moves further with respect to the cushion frame 26 (the fastening bolt 60). The impact energy imparted to the seatback frame 64 is thereby utilized as energy to plastically deform the weak portion 48 whereby impact load imparted to the seatback frame 64 is absorbed.

Due to the weak portion 48 extending continuously from the edge portion of the fixing hole 44 in a direction to separate from the fixing hole 44 (downward), deformation so as to press and widen out the weak portion 48 is suppressed when the weak portion 48 plastically deforms, instead the weak portion 48 is deformed so as to be squashed up. Consequently, plastic deformation of the weak portion 48 at low loads is suppressed, enabling the load imparted to the seatback frame 64 to be stably absorbed by the weak portion 48. Moreover, when the weak portion 48 is plastically deformed by the fastening bolt 60, due to the weak portion 48 being continuously plastically deformed, the load imparted to the seatback frame 64 can be efficiently absorbed by the weak portion 48.

Additionally, when the impact load in the vehicle rear direction is imparted to the seatback 62 (the seatback frame 64) and the hinge base bracket 40 moves, the hinge base bracket 40 rotationally moves upward about the axial line of the support hole 42. Due to the fastening bolt 60 accordingly moving relatively downward with respect to the hinge base bracket 40, the weak portion 48 is disposed below with respect to the fixing hole 44. Thus due to the weak portion 48 extending out from the fixing hole 44 toward the opposite side to the reclining mechanism, the weak portion 48 can be suppressed from influencing the reclining mechanism when the weak portion 48 is plastically deformed by the fastening bolt 60.

The guide hole 52 is also provided in the fixing plate 50. The guide hole 52 is formed so as to curve along the circumferential direction with the support hole 42 at the center, and an upper end portion of the guide hole 52 and the fixing hole 44 are in communication with each other, with the guide hole 52 extending downward from the upper end portion. The weak portion 48 can accordingly be easily formed so as to extend continuously from the edge portion of the guide hole 52. Moreover, when impact load is imparted to the seatback frame 64 in the vehicle rear direction and the hinge base bracket 40 relatively moves with respect to the cushion frame 26, movement of the hinge base bracket 40 can be guided by the guide hole 52.

Moreover, the weak portion 48 is provided to the hinge base bracket 40 by joining the support plate 56 and the fixing plate 50 to the hinge base bracket 40. The weak portion 48 can accordingly be formed with the sheet thickness of the hinge base bracket 40 set comparatively thin, enabling a reduction in weight of the hinge base bracket 40, and hence enabling a reduction in weight of the vehicle seat 10.

The flange 49 is also formed to the outer peripheral portion of the hinge base bracket 40. Thus, even though the sheet thickness of the hinge base bracket 40 is set comparatively thin, the overall rigidity of the hinge base bracket 40 can be secured by the flange 49.

MODIFIED EXAMPLE 1

The configuration of a modified example 1 is similar to that of the present exemplary embodiment, however differs in the following points.

Figure 6:
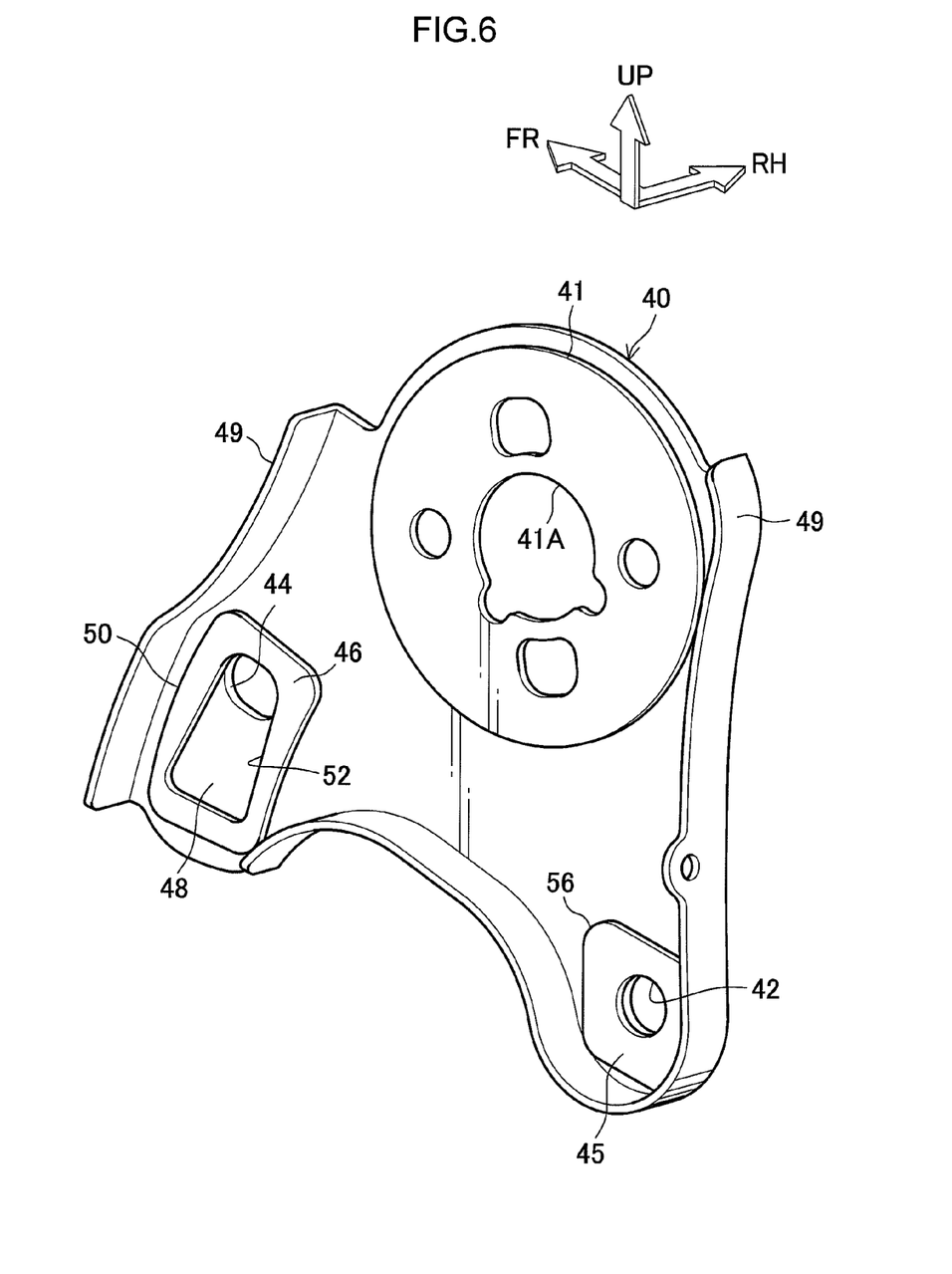
FIG. 6 is a perspective view illustrating a hinge base bracket employed in a vehicle seat according to an exemplary embodiment of the present invention.

As illustrated in FIG. 6, in the modified example 1, a width dimension of the guide hole 52 of the fixing plate 50 is set so as to become larger on progression in a direction away from the fixing hole 44 (downward).

Thus when the hinge base bracket 40 relatively moves with respect to the fastening bolt 60, a portion of the weak portion 48 that is pressed and squashed by the fastening bolt 60 can be easily pressed out to the width direction outside of the guide hole 52.

MODIFIED EXAMPLE 2

The configuration of a modified example 2 is similar to that of the present exemplary embodiment, however differs in the following points.

Figure 7:
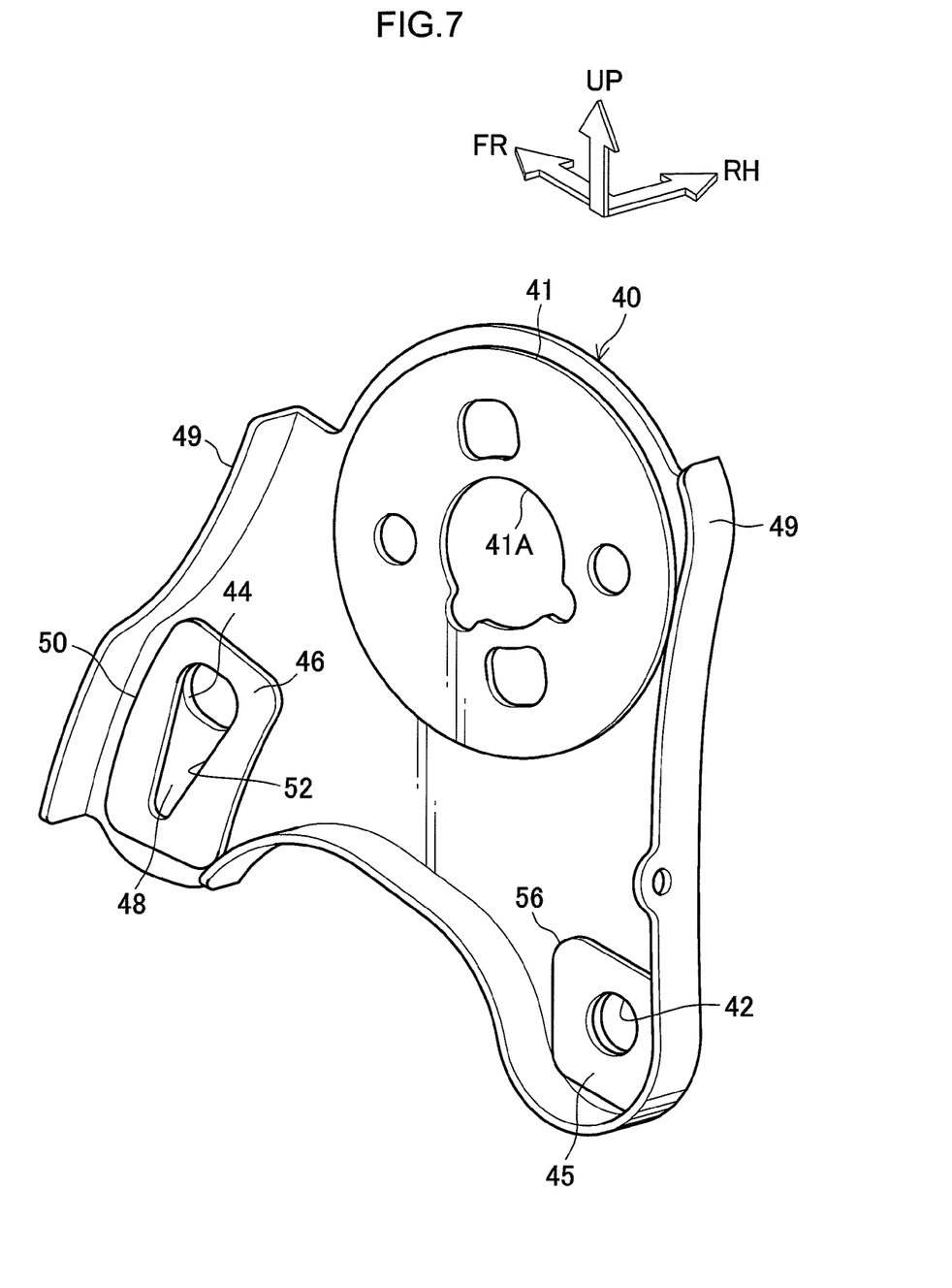
FIG. 7 is a perspective view illustrating a hinge base bracket employed in a vehicle seat according to an exemplary embodiment of the present invention.

As illustrated in FIG. 7, in the modified example 2, the width dimension of the guide hole 52 of the fixing plate 50 is set so as to become smaller on progression in a direction away from the fixing hole 44 (downward).

Thus the guide hole 52 is plastically deformed so as to be gradually pressed out to be widened by the fastening bolt 60 when the hinge base bracket 40 relatively moves with respect to the fastening bolt 60. The load imparted to the seatback frame 64 can hence also be absorbed by deformation of the fixing plate 50. The load imparted to the seatback frame 64 can accordingly be absorbed effectively.

Note that in the present exemplary embodiment, the modified example 1, and the modified example 2, the fixing plate 50 is joined to the hinge base bracket 40 by welding. However in place of this the fixing plate 50 may be joined to the hinge base bracket 40 by crimping.

Moreover, in the present exemplary embodiment, the modified example 1, and the modified example 2, the guide hole 52 is formed so as to curve around the circumferential direction centered on the support hole 42, and the upper end portion of the guide hole 52 and the fixing hole 44 are in communication with each other, with the guide hole 52 extending from the upper end portion downward. In place of this a lower end portion of the guide hole 52 may be formed so as to be open downward. In other words, the fixing plate 50 may be formed in a substantially inverted U-shape as viewed from the side. In short, it is sufficient that the configuration is made such that the weak portion 48 is formed in the direction of relative movement of the fastening bolt 60 with respect to the hinge base bracket 40.

Moreover, in the present exemplary embodiment, the modified example 1, and the modified example 2, the fastening bolt 60 is screwed into the fastening nut 34 fixed to the cushion frame 26, so as to couple the hinge base bracket 40 to the cushion frame 26. In place of this, the fastening bolt 60 may be fixed to the cushion frame 26 in a state in which the male thread portion 60A of the fastening bolt 60 projects out to the hinge base bracket 40 side, and the hinge base bracket 40 coupled to the cushion frame 26 by the fastening nut 34.

Moreover, in the present exemplary embodiment, the modified example 1, and the modified example 2, the guide hole 52 is provided to the fixing plate 50. In place of this, a metal sheet with a relatively thin sheet thickness compared to the sheet thickness of the fixing plate 50 may be integrally provided, such as by welding, to a portion where the guide hole 52 is provided in the embodiments, and a communication hole that communicates with the fixing hole 44 may be provided in the metal sheet. Moreover, for example, a resin plate may be integrally provided to a face of the fixing plate 50 on the hinge base bracket 40 side, and a communication hole that communicates with the fixing hole 44 and the guide hole 52 may be provided to the resin plate. Thus the impact force absorption when impact force in the vehicle rear direction is imparted to the seatback frame 64 can be adjusted by varying the thickness of the metal sheet or the resin plate.

Moreover, in the present exemplary embodiment, the modified example 1, and the modified example 2, the fixing hole 44 is disposed on the hinge base bracket 40 to the vehicle front side of the support hole 42, and the hinge base bracket 40 rotationally moves about the axial line of the support hole 42 of the hinge base bracket 40 when impact load in the vehicle rear direction is imparted to the seatback frame 64. In place of this, configuration may be made with the fixing hole 44 formed so as to pierce through a portion located at a vehicle rear direction at a lower portion of the hinge base bracket 40, and the support hole 42 formed so as to pierce through a portion at a vehicle front direction at a lower portion of the hinge base bracket 40, such that the hinge base bracket 40 rotates about the axial line of the support hole 42 when impact load in the vehicle rear direction is imparted to the seatback frame 64. In such cases, the fixing plate 50 and the guide hole 52 are disposed such that the weak portion 48 is disposed above the fixing hole 44.

Moreover, in the present exemplary embodiment, the modified example 1, and the modified example 2, the fixing plate 50 and the support plate 56 are configured from separate members, and then integrally provided to the hinge base bracket 40. In place of this, the fixing plate 50 and the support plate 56 may be constructed as a single body and then integrally provided to the hinge base bracket 40.

Moreover, in the present exemplary embodiment, the modified example 1, and the modified example 2, the fastening nut 34 is fixed to the side cushion frames 28 by welding. In place of this, the fastening nut 34 may be fixed to the side cushion frames 28 by crimping.

What is claimed is:

1. A vehicle seat comprising:
    a cushion frame provided inside a seat cushion;
    a seatback frame provided inside a seatback;
    a coupling member having a planar portion and a fixing hole disposed in the planar portion, the coupling member supporting the seatback frame rotatably and being fixed to the cushion frame via the fixing hole, the coupling member coupling the cushion frame to the seatback frame;
    a fixing plate that is integrally provided on a side of the planar portion and having an elongated guide hole overlapping the fixing hole, the elongated guide hole having a size greater than the fixing hole so as to form a thickened portion surrounding a weak portion of the coupling member; and
    a fixing portion disposed in the fixing hole to fix together the fixing plate, the coupling member, and the cushion frame, wherein
    the weak portion continuously extends from an edge portion of the fixing hole along with the elongated guide hole in a direction of relative movement of the fixing portion with respect to the coupling member when load is imparted to the seatback frame in a vehicle rear direction, and wherein the fixing portion plastically deforms the weak portion when the load is imparted to the seatback frame in the vehicle rear direction.

2. The vehicle seat of claim 1, further comprising:
    a support plate side thickened portion that is formed by integrally providing a support plate to the coupling member at the vehicle rear direction from the fixing hole on the side of the planar portion of the coupling member, and that includes a support hole for coupling the coupling member to the cushion frame, the coupling member moving rotationally upward, centered on the support hole, when the load is imparted to the seatback frame in the vehicle rear direction.

3. The vehicle seat of claim 2, wherein the elongated guide hole is provided at the fixing plate such that one end portion of the elongated guide hole is in communication with the fixing hole and the elongated guide hole extends from the one end portion along the direction of relative movement of the fixing portion with respect to the coupling member.

4. The vehicle seat of claim 3, wherein the width dimension of the elongated guide hole is set so as to become larger on progression in a direction away from the one end portion.

5. The vehicle seat of claim 3, wherein the width dimension of the elongated guide hole is set so as to become smaller on progression in a direction away from the one end portion.

6. The vehicle seat of claim 1, wherein a flange is formed from an outer peripheral portion of the coupling member so as to project out from the side of the planar portion of the coupling member.

7. The vehicle seat of claim 6, wherein:
    an attachment portion is formed at an upper side from the support hole at the coupling member such that a reclining mechanism is adopted to be attached to the attachment portion so as to couple together the coupling member and the seatback frame; and
    the flange extends along the outer peripheral portion of the coupling member as far as a vehicle rear side of the attachment portion.

8. The vehicle seat of claim 1, wherein the fixing portion presses against the weak portion in the direction of relative movement of the fixing portion with respect to the coupling member when load is imparted to the seatback frame in the vehicle rear direction.

9. A vehicle seat comprising:
    a cushion frame provided inside a seat cushion;
    a seatback frame provided inside a seatback;
    a coupling member that supports the seatback frame rotatably, that is provided with a fixing hole such that the coupling member is fixed to the cushion frame, and that couples together the cushion frame and the seatback frame;
    a fixing portion that is inserted through the fixing hole, and that fixes the coupling member to the cushion frame; and
    a fixing plate that is integrally provided at one side in a thickness direction of the coupling member, a thickened portion is formed by the fixing plate and the coupling member, and a weak portion is formed by the coupling member, the fixing plate is fixed to the coupling member and to the cushion frame by the fixing portion, wherein the weak portion continuously extends from an edge portion of the fixing hole in a direction of relative movement of the fixing portion with respect to the coupling member when load is imparted to the seatback frame in the vehicle rear direction, and the weak portion is pressed by the fixing portion in a direction of relative movement when the load is imparted to the seatback frame in a vehicle rear direction.

* * * * *